United States Patent
Sauermann

(10) Patent No.: US 8,261,485 B2
(45) Date of Patent: Sep. 11, 2012

(54) ADD-ON GREENHOUSE FOR ROOMS

(76) Inventor: Denis Sauermann, Berlin (DE)

( * ) Notice: Subject to any disclaimer, the term of this patent is extended or adjusted under 35 U.S.C. 154(b) by 255 days.

(21) Appl. No.: 12/811,122
(22) PCT Filed: Jan. 2, 2009
(86) PCT No.: PCT/EP2009/000001
§ 371 (c)(1),
(2), (4) Date: Jun. 29, 2010
(87) PCT Pub. No.: WO2009/083601
PCT Pub. Date: Jul. 9, 2009

(65) Prior Publication Data
US 2010/0282745 A1 Nov. 11, 2010

(30) Foreign Application Priority Data
Jan. 2, 2008 (DE) .................. 10 2008 003 134

(51) Int. Cl.
*A01G 9/00* (2006.01)
(52) U.S. Cl. .......................................................... 47/17
(58) Field of Classification Search ............ 47/17, 20.1, 47/21.1, 23.1, 23.2
See application file for complete search history.

(56) References Cited

U.S. PATENT DOCUMENTS

| 1,459,217 | A | * | 6/1923 | Klein | 43/126 |
| 3,424,178 | A | | 1/1969 | Yazaki | |
| 5,117,582 | A | * | 6/1992 | Cissel et al. | 47/32.4 |
| 5,930,948 | A | * | 8/1999 | Daniel | 47/23.1 |
| 7,160,588 | B2 | * | 1/2007 | Sanford et al. | 428/18 |
| 7,497,048 | B2 | * | 3/2009 | Bakowski | 47/31 |
| 2008/0155896 | A1 | | 7/2008 | Chen | |

FOREIGN PATENT DOCUMENTS

DE 3433215 A 3/1986

* cited by examiner

*Primary Examiner* — Monica Williams
(74) *Attorney, Agent, or Firm* — Andrew Wilford

(57) ABSTRACT

The invention concerns a propagator with a skeletal structure consisting of floor (5), roof (3), side (1) and door elements (1') which can each be separately and variably joined together and each have a light- and airtight covering (7) and guides (9) for stabilization and also connecting elements (11, 17). The covering (7) consists of several layers and has a highly reflective inner layer.
The stabilizing elements are made of round steel tubes. The connectors are flaps (11) which are connected to one another with hook-and-loop fastenings (13). A further connector element is a three-arm connector (17) for connecting side elements (1, 1') to one another.
The invention also involves a flange for connecting an interior compartment to an exterior framework, with a threaded connector (23) which can be guided precisely through an opening (21) in the border between the interior and the outside, and a threaded ring (25) which works together with the thread on the connector (23) to form the flange.

7 Claims, 3 Drawing Sheets

ADD-ON GREENHOUSE FOR ROOMS

CROSS REFERENCE TO RELATED APPLICATIONS

This application is the US national stage of PCT application PCT/EP2009/000001, filed 3 Jan. 2009, published 9 Jul. 2009 as 2009/083601, and claiming the priority of German patent application 102008003134.8 itself filed 2 Jan. 2008, whose entire disclosures are herewith incorporated by reference.

FIELD OF THE INVENTION

This invention concerns a propagator and equipment to conveniently connect the propagator to ventilation, water and power lines.

FIELD OF THE INVENTION

Nowadays it is becoming less and less possible to cultivate plants for food or ornament in a garden or on a piece of ground in towns and particularly in cities. In cities, people live mainly in multi-story apartment buildings which no longer permit the independent cultivation of agricultural plots or gardens. At the same time, the desire for personal exposure to products grown agriculturally or in the garden is increasing. In the U.S.A., pilot projects are already under way in cities to set up areas on tower blocks to be used agriculturally and as gardens to replace missing agricultural and garden areas. There, salads and other kinds of vegetables are already being cultivated at high altitude. Greenhouses are integrated into such facilities for cultivating and growing plants.

Propagators provide a further opportunity to promote this need for contact with agricultural or garden produce. In this respect, propagators formed by a framework of metal rods joined by appropriate connectors and covered by a one-piece light- and airtight cover made of laminated, multi-layer foil in the form of a tent which is closed with a zip fastener are already known. Shelves which can be fitted inside the propagator permit seeds and plants to be cultivated on several levels.

This known propagator type has several disadvantages. On the one hand, assembling the metal rod framework and pulling over the one-piece covering is laborious and on the other the propagator offers no possibilities for variable extension. The design permits its use in just two fixed sizes.

OBJECT OF THE INVENTION

Taking this as a starting point, it is the object of the present invention to create a propagator which can be provided in as wide a variety of sizes as possible and which is easier to assemble than the known propagator. An improved air supply, odor prevention and power and water supply were to be made available as an option at the same time.

SUMMARY OF THE INVENTION

This object is attained with a propagator consisting of a basic framework of floor, roof, side and door elements which can each be separately and variably connected to one another and which each have a light- and airtight covering and guides for stabilization and also for connecting elements.

In an advantageous embodiment the propagator according to the present invention can be optionally extended with further floor, roof, side and door elements as required.

The propagator covering is preferably made of several layers and has at least one textile layer, one plastic layer and one highly reflective layer.

The highly reflective layer can be a white film or a silver-coated sheet.

The covering's textile layer can be made of woven material and the plastic layer of polyethylene and these can then be formed into a laminate with the highly reflective layer.

The stabilizing elements of the propagator according to the invention can be made of rust-free material, preferably metal. According to one embodiment, the stabilizing elements are made of round steel tubes.

The connectors can be flaps formed on the floor, roof, side and door elements.

The flaps provided preferably have hooks and loops which enable adjacent elements to be connected to one another with hook-and-loop fastenings.

As a further connecting element, a preferably three-armed connector can be provided to connect the side and door elements to one another. This is provided to take up the stabilizing elements, preferably metal rods, from two horizontal and one vertical guides.

The invention is also concerned with a flange for connecting an interior compartment to an exterior framework with a threaded connector, the diameter of which is at least partly aligned with a cut-out in the border between the interior and the exterior so that it can be guided precisely through, and a threaded ring which works together with the thread of the connector to form the flange connection.

The connector preferably has a sealing ring.

The connector and/or the threaded ring may have an additional thread at the end furthest from the flange connection for fitting additional threaded connectors.

The additional connector can be a reducer. The flange according to the present invention can be used for numerous different applications. In one of the embodiments of the propagator according to the invention described above it is especially preferred for use as a connector for piping, especially for ventilation, water and power pipes and cables.

BRIEF DESCRIPTION OF THE DRAWING

The invention is described in more detail hereinafter with reference to an illustrate embodiment. In the drawing.

DETAILED DESCRIPTION

Figure 1:
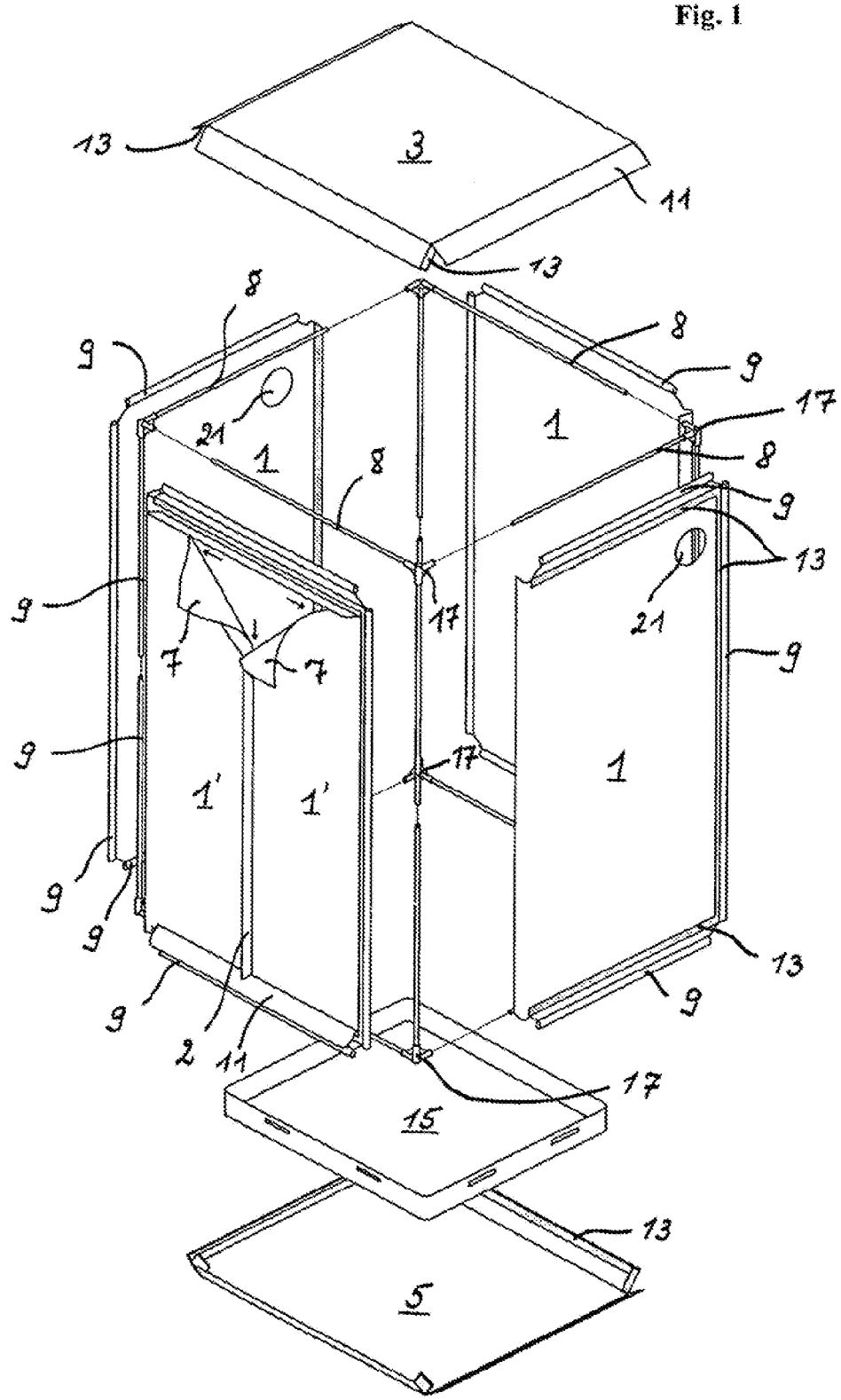
FIG. 1 is an exploded perspective view of the propagator according to the present invention.

FIG. 1 shows four side elements 1, 1' of a square propagator of which three side elements 1 are identical and the fourth side element 1' has a vertical zip fastener 2 in the middle serving as a door for access to the propagator. Zip fastener 2 is a standard item typically available for this purpose. The side elements 1, 1' are completed by two identical elements which serve as a roof element 3 and a floor element 5. All elements 1, 1', 3 and 5 have a tear-, light- and airtight covering 7 which in the example has multiple layers and consists of a 600 d woven material on the outside which has initially been laminated to an inner black polyethylene film, and on top of this an innermost layer of white film with a correspondingly strong reflective effect in the interior of the propagator.

Alternatively, the inner layer of the covering 7 can consist of silver foil. The latter permits especially high reflectivity.

Figure 2:
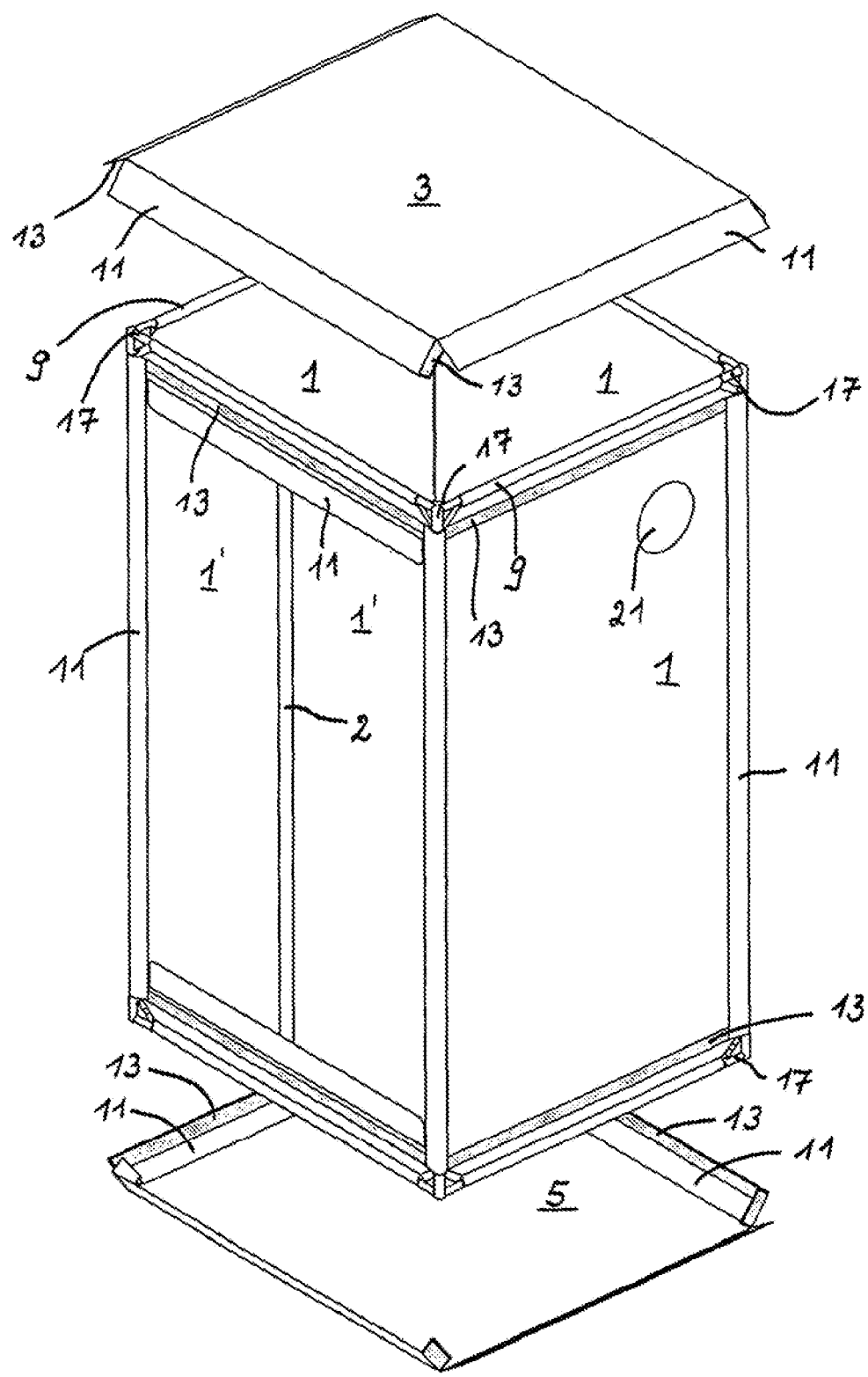
FIG. 2 is a perspective view of the propagator according to the present invention before the floor and roof elements are installed.

These propagator elements 1, 1', 2, and 3 are stabilized by metal rods 8 in the form of round steel tubes which are pushed into guides 9. The side 1, roof 3 and floor 5 elements are joined together with flaps 11 which are formed on the side 1, roof 3 and floor elements 5 and overlap, as FIG. 2 shows especially clearly. For the purpose of constructing the propagator quickly the flaps are alternately formed as hook and loop bands of a hook-and-loop fastener 13.

In this way, a propagator is created in the form of a box which can be but does not have to be square as in this typical embodiment. FIGS. 1 and 2 therefore show a square version, but from FIG. 1 it is clear that by using the appropriate number of metal rods 8 and round steel vertical tubes it is possible to make a rectangular box.

The particular advantage of the rectangular box is that individual boxes of the same size can be connected together, so that it is a simple matter to create a box of double or several times the size using one basic element which then together form the propagator. Several boxes are also connected to one another by means of the overlaps provided by the flaps 11 on the side, roof and floor elements 1, 3, and 5.

In the upper part of the propagator, fittings, which are not described in any more detail here, are provided for all necessary accessories which are required or which can be used in a propagator.

An extraction fan and a charcoal filter can also be optionally fitted in the upper part of the propagator to produce a chimney effect which prevents unpleasant odors and ensures sufficient air circulation.

There is also a removable, waterproof and washable shelf 15 in the lower part.

The assembly of the propagator according to the present invention is described in more detail in the following. Assembly begins with a side element 1, and metal rods 8 in the form of stainless steel tubes are first pushed into the guides 9 provided in the side element 1. In the case of rectangular propagators, two metal rods 8 may be required for the vertically aligned side elements. Just one size of metal rod 8 is normally required for square propagators.

After the metal rods 8 have been inserted, a three-armed connector 17 which permits the prepared side element 1 to be connected to a further side element 1 is fitted to each of the corners. The roof element 3 and the floor element 5 have no metal rods 8 or guides in the example embodiment.

A further side element 1, also prepared as just described, is now accordingly added approximately at a right angle to the first side element 1 and then the next side element 1 on the opposite side, also approximately at right-angles. The metal rods 8 are accordingly inserted into the appropriate guides 17. Finally, the fourth side element 1 is connected to the adjacent side elements 1. The floor element 5 is then fixed to the four side elements by means of the hook-and-loop fastening already described and the box is then positioned so that the floor element 5 faces downward. The roof element 3 is now also secured in place by means of a hook-and-loop fastening with corresponding hook and loop tapes. Finally, all the hook-and-loop fastening bands on the sides which have not yet been closed and which are not required for adding a further box are folded up to form the finished box and the finished propagator.

The simplest version contains access and outflow pipes for e.g. power, water and ventilation in the base of each propagator box. Suitable openings which are familiar to any person skilled in the art with regard to the design are provided at pre-defined locations in the covering 7.

In one particular embodiment of the propagator according to the present invention these openings are replaced with a specially developed flange 19 which then forms a further part of the box according to the present invention. This flange 19 is shown in more detail in FIG. 3. It serves to integrate ventilation, water and power lines into the respective boxes or just one of the propagator boxes.

An opening 21 is provided at a suitable location in the covering 7 which is normally circular and through which a connector 23 fitted with a silicone sealing ring 24 is more or less precisely inserted and screwed together with one of the threaded rings 25 working together with the connector thread 23 to form a flange 19 on the other side of the covering 7. As FIG. 1 shows, two of these circular openings 21 are provided in the example propagator on opposing side elements 1 of the box shown. One or more additional boxes would be connected to both these side elements 1 so that the ventilation, water and power connections can be extended into the adjacent boxes via flange 19.

Figure 3:
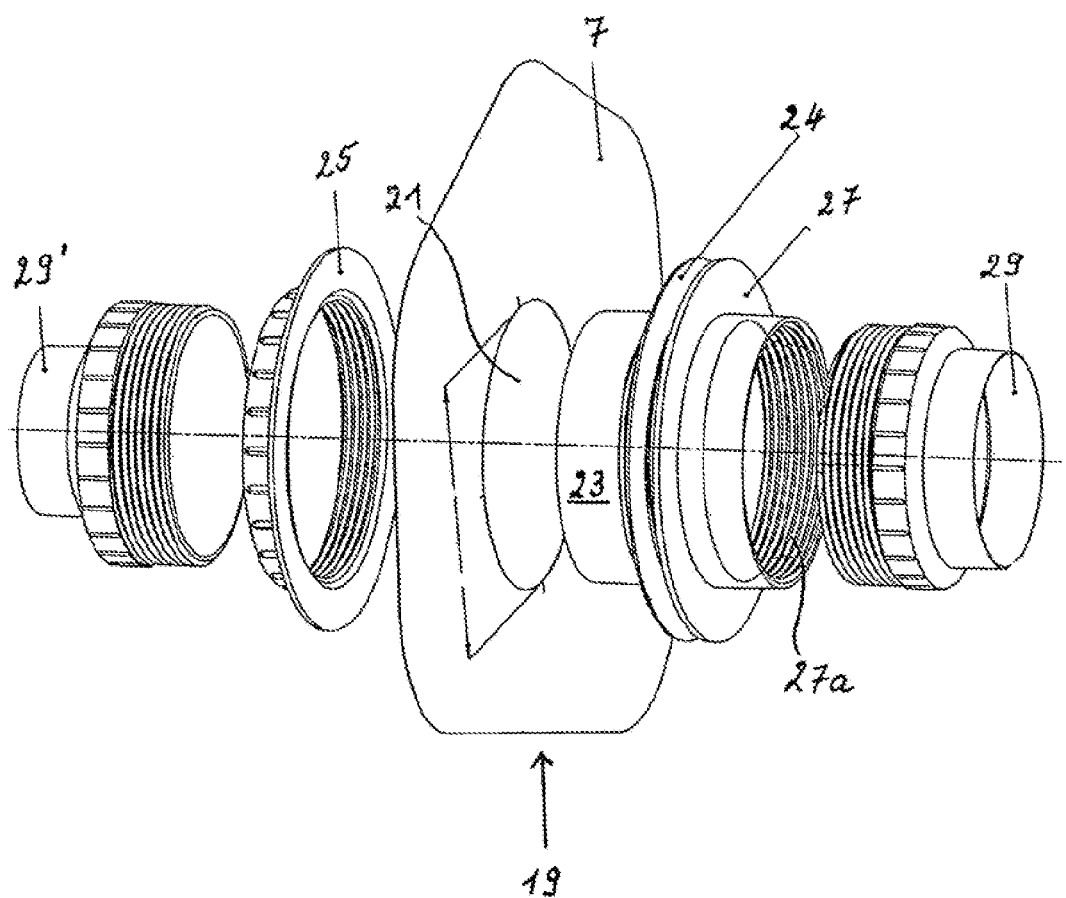
FIG. 3 is a detail view of a flap according to the present invention.

A collar 27 with inner thread 27a is connected to the sealing ring 24 of connector 23 and thus in the direction provided for by covering 7 which can be used for connection to further piping elements for ventilation, water and power connection or alternatively, as shown in FIG. 3, also provides a reducer 29. A comparable reducer 29' can also be optionally provided connected to threaded ring 25.

In the example embodiment, an ABS plastic was used as the material for flange 19. Other plastic materials also known to anyone skilled in the art can, however, equally be used.

The invention claimed is:

1. A propagator with a skeletal structure consisting of floor, roof, side and door components which can each be separately and variably joined together and each have a light- and airtight covering and guides for stabilization and also connecting components, the propagator being extensible indefinitely with any number of further floor, side, and door components, the covering having at least one textile layer, a plastic coating, and a coating with high surface reflectivity, the connecting components being formed as flaps on the floor, roof, side, and door components.

2. The propagator defined in claim 1, wherein the highly reflective coating is a plastic film or a plastic film with a silver coating.

3. The propagator defined in claim 1, wherein the textile layer consists of woven material and the plastic layer of polyethylene and that these form a laminate together with the highly reflective coating.

4. The propagator defined in claim 1, further comprising stabilization components made of non-rusting metal.

5. The propagator defined in claim 4, wherein the stabilization components are metal poles made of round steel tubes.

6. The propagator defined in claim 1, wherein the flaps have hooks and loops which permit adjacent components to be connected to each other by means of a hook-and-loop fastening.

7. The propagator defined in claim 1, wherein primarily a three-armed connector is provided as a further connector for connecting the side components to each other.

* * * * *